(12) United States Patent
Wu

(10) Patent No.: US 12,395,887 B2
(45) Date of Patent: Aug. 19, 2025

(54) TRANSMISSION PRIORITY PROCESSING METHOD, TERMINAL, AND NETWORK-SIDE DEVICE

(71) Applicant: VIVO MOBILE COMMUNICATION CO., LTD., Guangdong (CN)

(72) Inventor: Yumin Wu, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 456 days.

(21) Appl. No.: 17/900,805

(22) Filed: Aug. 31, 2022

(65) Prior Publication Data
US 2022/0417791 A1    Dec. 29, 2022

Related U.S. Application Data

(63) Continuation of application No. PCT/CN2021/085970, filed on Apr. 8, 2021.

(30) Foreign Application Priority Data

Apr. 8, 2020    (CN) .......................... 202010270793.4

(51) Int. Cl.
*H04W 28/04*    (2009.01)
*H04W 72/566*    (2023.01)

(52) U.S. Cl.
CPC ......... *H04W 28/04* (2013.01); *H04W 72/566* (2023.01)

(58) Field of Classification Search
CPC ... H04W 28/04; H04W 72/566; H04W 74/08; H04W 72/1268; H04W 72/569; H04W 72/21
See application file for complete search history.

(56) References Cited

U.S. PATENT DOCUMENTS 9,408,201 B2 *   8/2016   Nam ................... H04L 5/001
10,440,701 B2 * 10/2019   He ................... H04W 52/367
(Continued)

FOREIGN PATENT DOCUMENTS

| CN | 110719646 A | 1/2020 |
| CN | 110972317 A | 4/2020 |
| WO | WO-2020144403 A1 * | 7/2020 |

OTHER PUBLICATIONS

Source: Nokia, Nokia Shanghai Bell, Discussion and Decision, Intra-UE Prioritization for conflicts with existing MAC PDU, R2-2000814, dated Feb. 24-Mar. 6, 2020.
(Continued)

*Primary Examiner* — Ajay Cattungal
(74) *Attorney, Agent, or Firm* — BROOKS KUSHMAN P.C.

(57) ABSTRACT

A transmission priority processing method, a terminal, and a network-side device are provided. A transmission priority processing method applied to the terminal includes: performing P comparison operations in a case that at least one uplink signal is having a transmission collision, where the $i^{th}$ comparison operation is used to compare priorities of N uplink signals under transmission collision at a first moment, the first moment is an execution moment of the $i^{th}$ comparison operation, a value of i ranges from 1 to P, P is a positive integer less than or equal to K, and both K and N are integers greater than 1.

20 Claims, 5 Drawing Sheets

Send third indication information to a terminal, where the third indication information is used to indicate that the terminal performs a first comparison operation on priority of at least one uplink signal at a fourth moment in a case that the at least one uplink signal is having a transmission collision; where an interval $T_2$ is present between the fourth moment and a second sending moment of a third target uplink signal in the at least one uplink signal, and the fourth moment is earlier than the second sending moment — 401

(56) References Cited

U.S. PATENT DOCUMENTS

| | | | |
|---|---|---|---|
| 11,324,024 B2* | 5/2022 | Khoshnevisan | H04B 7/024 |
| 11,375,525 B2* | 6/2022 | Lin | H04W 80/08 |
| 11,432,318 B2* | 8/2022 | Lu | H04W 72/21 |
| 12,177,832 B2* | 12/2024 | Yamamoto | H04L 1/1812 |
| 2014/0086174 A1* | 3/2014 | Nam | H04L 1/0031 |
| | | | 370/329 |
| 2015/0271812 A1* | 9/2015 | Nam | H04W 72/0446 |
| | | | 370/329 |
| 2018/0352582 A1 | 12/2018 | Yi et al. | |
| 2021/0219300 A1 | 7/2021 | Lou et al. | |
| 2022/0015135 A1* | 1/2022 | Yang | H04L 1/1822 |
| 2022/0159667 A1* | 5/2022 | Zhang | H04W 72/0453 |
| 2022/0287057 A1* | 9/2022 | Yamamoto | H04W 72/1268 |
| 2022/0417791 A1* | 12/2022 | Wu | H04W 72/566 |

OTHER PUBLICATIONS

International Search Report and Written Opinion for Application No. PCT/CN2021/085970, dated Jun. 28, 2021, 9 pages.
Extended European Search Report for Application No. 21783881.2, dated Jul. 26, 2023, 8 Pages.
Nokia, Nokia Shanghai Bell "3GPP TSG RAN WG1 Ad-Hoc Meeting 1901" Taipei, Taiwan, Jan. 2019, R1-1900934, 6 Pages.
First Office Action for Japanese Application No. 2022-560509, dated Oct. 23, 2023, 3 Pages.
CATT "Data/data prioritization" 3GPP TSG-RAN WG2 Meeting #107bis, Chongqing, P. R. China, Oct. 2019, R2-1912211, 5 Pages.

* cited by examiner

Perform P comparison operations in a case that at least one uplink signal is having a transmission collision, where the $i^{th}$ comparison operation is used to compare priorities of N uplink signals under transmission collision at a first moment, the first moment is an execution moment of the $i^{th}$ comparison operation, a value of i ranges from 1 to P, P is a positive integer less than or equal to K, and both K and N are integers greater than 1 — 101

FIG. 1

In a case that at least one uplink signal is having a transmission collision, perform a first comparison operation on priority of the at least one uplink signal at a fourth moment; where an interval $T_2$ is present between the fourth moment and a second sending moment of a third target uplink signal in the at least one uplink signal, and the fourth moment is earlier than the second sending moment — 201

FIG. 2

Send first indication information to a terminal, where the first indication information is used to indicate that the terminal performs P comparison operations in a case that at least one uplink signal is having a transmission collision, where the $i^{th}$ comparison operation is used to compare priorities of N uplink signals under transmission collision at a first moment, the first moment is an execution moment of the $i^{th}$ comparison operation, a value of i ranges from 1 to P, P is a positive integer less than or equal to K, and both K and N are integers greater than 1 — 301

FIG. 3

Send third indication information to a terminal, where the third indication information is used to indicate that the terminal performs a first comparison operation on priority of at least one uplink signal at a fourth moment in a case that the at least one uplink signal is having a transmission collision; where an interval $T_2$ is present between the fourth moment and a second sending moment of a third target uplink signal in the at least one uplink signal, and the fourth moment is earlier than the second sending moment — 401

FIG. 4

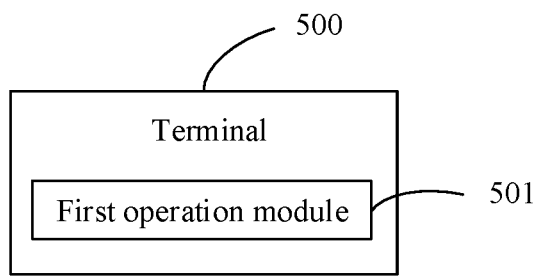

FIG. 5

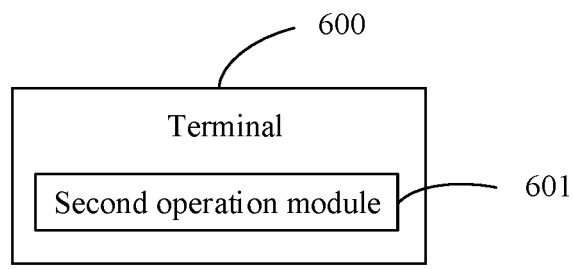

FIG. 6

TRANSMISSION PRIORITY PROCESSING METHOD, TERMINAL, AND NETWORK-SIDE DEVICE

CROSS-REFERENCE TO RELATED APPLICATIONS

This application is a continuation of PCT International Application No. PCT/CN2021/085970 filed on Apr. 8, 2021, which claims priority to Chinese Patent Application No. 202010270793.4, filed on Apr. 8, 2020, which are incorporated herein by reference in their entireties.

TECHNICAL FIELD

Embodiments of the present invention relate to the field of communications technologies, and in particular, to a transmission priority processing method, a terminal, and a network-side device.

BACKGROUND

When there is a transmission collision between a plurality of uplink signals to be sent by a terminal, the terminal has to send only one of the uplink signals.

The terminal may preferentially send a high-priority uplink signal according to a priority order of the plurality of uplink signals. However, in the prior art, before sending the high-priority uplink signal, the terminal determines priorities of the plurality of uplink signals only once, featuring relatively low flexibility in priority judgment on uplink signals.

SUMMARY

Embodiments of the present invention provide a transmission priority processing method, a terminal, and a network-side device, so as to resolve the prior-art problem of relatively low flexibility in priority judgment on uplink signals.

In order to resolve the foregoing problem, the present invention is implemented as follows:

According to a first aspect, an embodiment of the present invention provides a transmission priority processing method, applied to a terminal. The method includes:

performing P comparison operations in a case that at least one uplink signal is having a transmission collision, where the $i^{th}$ comparison operation is used to compare priorities of N uplink signals under transmission collision at a first moment, the first moment is an execution moment of the $i^{th}$ comparison operation, a value of i ranges from 1 to P, P is a positive integer less than or equal to K, and both K and N are integers greater than 1.

According to a second aspect, an embodiment of the present invention provides a transmission priority processing method, applied to a terminal. The method includes:

in a case that at least one uplink signal is having a transmission collision, performing a first comparison operation on priority of the at least one uplink signal at a fourth moment; where an interval T2 is present between the fourth moment and a second sending moment of a third target uplink signal in the at least one uplink signal, and the fourth moment is earlier than the second sending moment.

According to a third aspect, an embodiment of the present invention provides a transmission priority processing method, applied to a network-side device. The method includes:

sending first indication information to a terminal, where the first indication information is used to indicate that the terminal performs P comparison operations in a case that at least one uplink signal is having a transmission collision, where the $i^{th}$ comparison operation is used to compare priorities of N uplink signals under transmission collision at a first moment, the first moment is an execution moment of the $i^{th}$ comparison operation, a value of i ranges from 1 to P, P is a positive integer less than or equal to K, and both K and N are integers greater than 1.

According to a fourth aspect, an embodiment of the present invention provides a transmission priority processing method, applied to a network-side device. The method includes:

sending third indication information to a terminal, where the third indication information is used to indicate that the terminal performs a first comparison operation on priority of at least one uplink signal at a fourth moment in a case that the at least one uplink signal is having a transmission collision; where an interval T2 is present between the fourth moment and a second sending moment of a third target uplink signal in the at least one uplink signal, and the fourth moment is earlier than the second sending moment.

According to a fifth aspect, an embodiment of the present invention further provides a terminal. The terminal includes:

a first operation module, configured to: perform P comparison operations in a case that at least one uplink signal is having a transmission collision, where the $i^{th}$ comparison operation is used to compare priorities of N uplink signals under transmission collision at a first moment, the first moment is an execution moment of the $i^{th}$ comparison operation, a value of i ranges from 1 to P, P is a positive integer less than or equal to K, and both K and N are integers greater than 1.

According to a sixth aspect, an embodiment of the present invention further provides a terminal. The terminal includes:

a second operation module, configured to: in a case that at least one uplink signal is having a transmission collision, performing a first comparison operation on priority of the at least one uplink signal at a fourth moment; where an interval T2 is present between the fourth moment and a second sending moment of a third target uplink signal in the at least one uplink signal, and the fourth moment is earlier than the second sending moment.

According to a seventh aspect, an embodiment of the present invention further provides a network-side device, where the network-side device includes:

a third sending module, configured to send first indication information to a terminal, where the first indication information is used to indicate that the terminal performs P comparison operations in a case that at least one uplink signal is having a transmission collision, where the $i^{th}$ comparison operation is used to compare priorities of N uplink signals under transmission collision at a first moment, the first moment is an execution moment of the $i^{th}$ comparison operation, a value of i ranges from 1 to P, P is a positive integer less than or equal to K, and both K and N are integers greater than 1.

According to an eighth aspect, an embodiment of the present invention further provides a network-side device, where the network-side device includes:

a fifth sending module, configured to: send third indication information to a terminal, where the third indication information is used to indicate that the terminal performs a first comparison operation on priority of at least one uplink signal at a fourth moment in a case that the at least one uplink signal is having a transmission collision; where an interval T2 is present between the fourth moment and a second sending moment of a third target uplink signal in the at least one uplink signal, and the fourth moment is earlier than the second sending moment.

According to a ninth aspect, an embodiment of the present invention further provides a terminal, where the terminal includes a processor, a memory, and a computer program stored in the memory and capable of running on the processor. When the computer program is executed by the processor, the steps of the transmission priority processing method according to the first aspect or the second aspect are implemented.

According to a tenth aspect, an embodiment of the present invention further provides a network-side device, where the network-side device includes a processor, a memory, and a computer program stored in the memory and capable of running on the processor. When the computer program is executed by the processor, the steps of the transmission priority processing method according to the third aspect or the fourth aspect are implemented.

According to an eleventh aspect, an embodiment of the present invention further provides a computer-readable storage medium, where the computer-readable storage medium stores a computer program, and when the computer program is executed by a processor, the steps of the transmission priority processing method according to the first aspect, the second aspect, the third aspect, or the fourth aspect are implemented.

In the embodiments of the present invention, in a case that the at least one uplink signal is having a transmission collision, P comparison operations are performed, where the $i^{th}$ comparison operation is used to compare the priorities of the N uplink signals under transmission collision at the first moment, the first moment is an execution moment of the $i^{th}$ comparison operation, the value of i ranges from 1 to P, P is a positive integer less than or equal to K, and both K and N are integers greater than 1. It can be learned that in the embodiments of the present invention, flexibility in priority judgment on uplink signals can be improved and reliability of uplink signal transmission can be further improved.

BRIEF DESCRIPTION OF DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may derive other drawings from these accompanying drawings without creative efforts.

FIG. 1 is a first flowchart of a transmission priority processing method according to an embodiment of the present invention;

FIG. 2 is a second flowchart of a transmission priority processing method according to an embodiment of the present invention;

FIG. 3 is a third flowchart of a transmission priority processing method according to an embodiment of the present invention;

FIG. 4 is a fourth flowchart of a transmission priority processing method according to an embodiment of the present invention;

FIG. 5 is a first structural diagram of a terminal according to an embodiment of the present invention;

FIG. 6 is a second structural diagram of a terminal according to an embodiment of the present invention;

DETAILED DESCRIPTION

Figure 7:
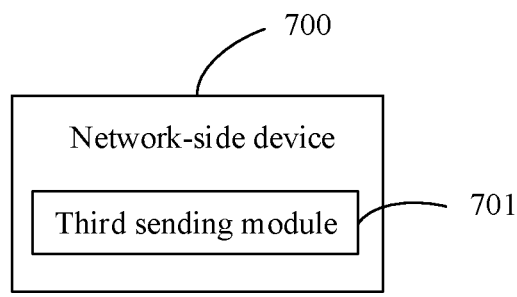
FIG. 7 is a first structural diagram of a network-side device according to an embodiment of the present invention.

The following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

In the specification and claims of this application, the terms such as "first" and "second" are intended to distinguish between similar objects but do not necessarily indicate a specific order or sequence. Moreover, the terms "include", "have" and any other variants mean to cover the non-exclusive inclusion, for example, a process, method, system, product, or device that includes a list of steps or units is not necessarily limited to those units, but may include other units not expressly listed or inherent to such a process, method, product, or device. In addition, the use of "and/or" in this application means at least one of connected objects. For example, A and/or B and/or C means the following seven cases: A alone, B alone, C alone, both A and B, both B and C, both A and C, and all of A, B, and C.

For ease of understanding, the following describes some content included in the embodiments of the present invention.

When a terminal (or referred to as user equipment (UE)) needs to send two or more uplink channels, the UE may send only one uplink channel due to overlapping (for example, partially or completely overlapping) sending times. In this case, the UE preferentially sends a high-priority uplink signal according to a priority order of the plurality of uplink signals. There are processing rules as follows:

In a case that sending times of physical uplink shared channels (PUSCH) of two uplink grants overlap to cause a transmission collision, priorities of the uplink grants are determined based on priorities of logical channels corresponding to data contained in medium access control (MAC) protocol data units (PDU) generated based on the uplink grants. A MAC PDU generated based on the higher-priority uplink grant is sent first, and that for a lower-priority uplink grant is no longer sent.

In a case that sending times of a PUSCH with uplink grant and a scheduling request (SR) overlap to cause a transmission collision, priorities of the uplink grant and the SR are determined based on priority of a logical channel corresponding to data contained in a MAC PDU generated based on the uplink grant and based on priority of a logical channel triggering transmission of the SR. The one with a higher priority is sent, and that with a low priority is not sent.

During specific implementation, the uplink grant may include at least one of the following: a configured uplink grant (CG) and a dynamic uplink grant (DG).

The following describes a transmission priority processing method in the embodiments of the present invention.

Referring to FIG. 1, FIG. 1 is a first flowchart of a transmission priority processing method according to an embodiment of the present invention. The transmission priority processing method shown in FIG. 1 is applied to a terminal. In practical application, the terminal may be a mobile phone, a tablet computer (Tablet Personal Computer), a laptop computer, a personal digital assistant (PDA), a mobile Internet device (MID), a wearable device, an in-vehicle device, or the like.

As shown in FIG. 1, the transmission priority processing method may include the following steps.

Step 101: Perform P comparison operations in a case that at least one uplink signal is having a transmission collision, where the $i^{th}$ comparison operation is used to compare priorities of N uplink signals under transmission collision at a first moment, the first moment is an execution moment of the $i^{th}$ comparison operation, a value of i ranges from 1 to P, P is a positive integer less than or equal to K, and both K and N are integers greater than 1.

During specific implementation, if sending times of at least one uplink signal overlap, for example, partially or completely overlap, it may be considered that the at least one uplink signal is having a transmission collision.

It should be noted that, in a case that P is greater than 1 and less than or equal to K, uplink signals for priority comparison in each of the P comparison operations may be the same or different.

For example, the $(i+1)^{th}$ comparison operation is used to compare priorities of M uplink signals under transmission collision at a second moment, where the second moment is an execution moment of the $(i+1)^{th}$ comparison operation. It is also assumed that the N uplink signals include uplink signal 1, uplink signal 2, and uplink signal 3.

In a first implementation, the M uplink signals and the N uplink signals may be the same, including uplink signal 1, uplink signal 2, and uplink signal 3

In a second implementation, the M uplink signals may include other uplink signals in addition to the N uplink signals, for example, the M uplink signals include uplink signal 1, uplink signal 2, uplink signal 3, and uplink signal 4.

In a third implementation, the M uplink signals may include part of the N uplink signals, for example, the M uplink signals include uplink signal 1 and uplink signal 2.

In practical application, in the case that at least one uplink signal is having a transmission collision, the behavior of performing P comparison operations by the terminal may be configured by a network-side device or predetermined by a protocol.

In a case that the behavior is configured by the network-side device, optionally, before the performing P comparison operations in a case that at least one uplink signal is having a transmission collision, the method further includes:

receiving first indication information sent by the network-side device, where the first indication information is used to indicate that the terminal performs P comparison operations in a case that at least one uplink signal is having a transmission collision, where the $i^{th}$ comparison operation is used to compare priorities of N uplink signals under transmission collision at a first moment, the first moment is an execution moment of the $i^{th}$ comparison operation, a value of i ranges from 1 to P, P is a positive integer less than or equal to K, and both K and N are integers greater than 1.

According to the transmission priority processing method in this embodiment, in the case that the at least one uplink signal is having a transmission collision, P comparison operations are performed, where the $i^{th}$ comparison operation is used to compare the priorities of the N uplink signals under transmission collision at the first moment, the first moment is an execution moment of the $i^{th}$ comparison operation, the value of i ranges from 1 to P, P is a positive integer less than or equal to K, and both K and N are integers greater than 1. It can be learned that in this embodiment of the present invention, flexibility in priority judgment on uplink signals can be improved and reliability of uplink signal transmission can be further improved.

In the embodiment shown in FIG. 1, optionally, the uplink signals under transmission collision include at least one of the following signal types: physical random access channel (PRACH) signal, physical uplink control channel (PUCCH) signal, physical uplink shared channel (PUSCH) signal, and sounding reference signal (SRS).

In specific implementation, the PRACH signal may be: PRACH transmission triggered by arrival of uplink data on a specific logical channel; the PUCCH signal may be: SR transmission; the PUSCH signal may be PUSCH transmission corresponding to a CG or DG, which are not limited thereto.

Therefore, it can be understood that the uplink signal in transmission collision may include at least one of the following: CG, DG, or SR, which is not limited thereto.

Optionally, the priority of the CG or DG may be determined based on priorities of its transmittable data. For example, transmittable data of CG1 is data 1, transmittable data of CG2 is data 2, and priority of data 1>priority of data 2. In this case, priority of CG1 is higher than priority of CG2.

It should be noted that in practical application, the number of pieces of transmittable data included in the CG or DG may be greater than 1. In this case, the priority of the CG or DG may be determined based on a highest priority in priorities of a plurality of pieces of transmittable data included in the CG or DG. For example, the transmittable data of CG1 includes data 1 and data 3, the transmittable data of CG2 are data 2 and data 1, and priority of data 3>priority of data 1>priority of data 2. In this case, the priority of CG1 is determined based on the priority of data 3, and the priority of CG2 is determined based on the priority of data 1. Because the priority of data 3>the priority of data 1, the priority of CG1 is higher than the priority of CG2.

The priority of the SR may be determined based on the priority of the logical channel that triggers transmission of the SR. For example, transmission of SR1 is triggered by logical channel 1, transmission of SR2 is triggered by logical channel 2, and priority of logical channel 2 is higher than priority of logical channel 1. In this case, priority of SR2 is higher than priority of SR1.

It should be noted that transmission of the SR may be triggered by a plurality of logical channels. In this case, the priority of the SR may be determined based on a highest priority in priorities corresponding to the plurality of logical channels that trigger transmission of the SR. For example, transmission of SR1 is triggered by logical channel 1 and logical channel 3 successively, transmission of SR2 is triggered by logical channel 1 and logical channel 2 successively, and priority of logical channel 2>priority of logical channel 1>priority of logical channel 3. In this case, priority of SR1 is determined based on logical channel 1, and priority of SR2 is determined based on logical channel 2. Because the priority of logical channel 2>the priority of logical channel 1, the priority of SR2 is higher than the priority of SR1.

In the embodiment shown in FIG. 1, optionally, the performing P comparison operations includes:

in a case that the $i^{th}$ comparison operation has been performed, performing the $(i+1)^{th}$ comparison operation if a first condition is satisfied, where the first condition being satisfied includes at least one of the following:

priorities of uplink signals under transmission collision being changed; and the number of uplink signals under transmission collision being changed.

For ease of understanding, descriptions are provided by using an example.

It is assumed that P is 3. During specific implementation, after the terminal performs the $1^{st}$ comparison operation, if the first condition is satisfied, the terminal performs the $2^{nd}$ comparison operation, that is, performs a comparison operation again. Further, after the terminal performs the $2^{nd}$ comparison operation, if the first condition is satisfied again, the terminal performs the $3^{rd}$ comparison operation, that is, performs a comparison operation again.

The following describes the first condition satisfied by the terminal.

When the first condition satisfies a scenario 1 with the priorities of uplink signals under transmission collision being changed, optionally, the priority of an uplink signal under transmission collision having changed includes at least one of the following:

(a) priority of a first uplink signal in the N uplink signals at a second moment is higher than priority of the first uplink signal at the first moment;

(b) priority of a second uplink signal in the N uplink signals at the second moment is lower than the priority of the first uplink signal at the first moment; and (c) a first comparison result is different from a second comparison result, where the first comparison result is a comparison result between priorities of a third uplink signal and a fourth uplink signal in the N uplink signals at the first moment, and the second comparison result is a comparison result between priorities of the third uplink signal and the fourth uplink signal at the second moment; where the second moment is an execution time of the $(i+1)^{th}$ comparison operation.

Details are described as follows:

In a case that the priority of an uplink signal under transmission collision having changed includes (a), the priority of the first uplink signal at the second moment is higher than that at the first moment, and a comparison result between the priorities of the N uplink signals at the second moment may be the same as or different from that at the first moment.

Further, the first uplink signal may be any uplink signal in the N uplink signals other than the highest-priority uplink signal. That is, in the N uplink signals, the first uplink signal determined as low priority at the first moment has a higher priority at the second moment. Because the at least one uplink signal is having a transmission collision, the terminal selects to send the highest-priority uplink signal in the at least one uplink signal. Therefore, if the priority of the highest-priority uplink signal in the N uplink signals becomes higher, even if the terminal performs the $(i+1)^{th}$ comparison operation, the highest-priority uplink signal in the N uplink signals that is determined by the terminal may remain unchanged. In this way, the terminal may perform the $(i+1)^{th}$ operation only in a case that priority of an uplink signal in the N uplink signals other than the highest-priority uplink signal becomes higher, thereby reducing operating burden of the terminal.

For ease of understanding, descriptions are provided by using an example.

It is assumed that the N uplink signals include CG1 and CG2. It is also assumed that at the first moment, transmittable data of CG1 includes data 1, transmittable data of CG2 includes data 2, and priority of data 1 is higher than priority of data 2.

Then, the priority of CG1 is higher than the priority of CG2 at the first moment.

If data 3 is newly added to the transmittable data of CG2 before the second moment, and priority of data 3 is higher than the priority of data 1. Because the priority of data 3>the priority of data 1>the priority of data 2, the priority of CG2 at the second moment is higher than that at the first moment, and the priority of CG2 is higher than the priority of CG1 at the second moment. It can be learned that, in this case, not only the priority of CG2 at the second moment is higher than that at the first moment, but also a comparison result between CG1 and CG2 at the second moment is different from that at the first moment.

If data 4 is newly added to the transmittable data of CG2 before the second moment, and priority of data 4 is higher than the priority of data 2 and lower than the priority of data 1. Because the priority of data 1>the priority of data 4>the priority of data 2, the priority of CG2 at the second moment is higher than that at the first moment, and the priority of CG1 is higher than the priority of CG2 at the second moment. It can be learned that, in this case, the priority of CG2 at the second moment is higher than that at the first moment; however, a comparison result between CG1 and CG2 at the second moment is the same as that at the first moment.

In a case that the priority of an uplink signal under transmission collision having changed includes (b), the priority of the second uplink signal at the second moment is lower than that at the first moment; however, a comparison result between the priorities of the N uplink signals at the second moment may be the same as or different from that at the first moment.

Further, the second uplink signal may be the highest-priority uplink signal in the N uplink signals. That is, in the N uplink signals, the second uplink signal determined as the highest priority at the first moment has a lower priority at the second moment. Because the at least one uplink signal is having a transmission collision, the terminal selects to send the highest-priority uplink signal in the at least one uplink signal. Therefore, if priority of an uplink signal in the N uplink signals other than the highest-priority uplink signal becomes lower, even if the terminal performs the $(i+1)^{th}$ comparison operation, the highest-priority uplink signal in the N uplink signals determined by the terminal may remain unchanged. In this way, the terminal may perform the $(i+1)^{th}$ operation only in a case that priority of the highest-priority uplink signal in the N uplink signals becomes lower, thereby reducing operating burden of the terminal.

For ease of understanding, descriptions are provided by using an example.

It is assumed that the N uplink signals include CG1 and CG2. It is also assumed that at the first moment, transmittable data of CG1 includes data 1, transmittable data of CG2 includes data 2 and data 3, and priority of data 1>priority of data 2>priority of data 3.

Then, the priority of CG1 is higher than the priority of CG2 at the first moment.

If the transmittable data of CG2 includes only data 3 at the second moment, for example, the data 2 of CG2 has been sent by using another uplink grant before the second moment, the priority of CG2 at the second moment is lower than that at the first moment, and the priority of CG1 is higher than the priority of CG2 at the second moment. It can be learned that, in this case, the priority of CG2 at the second moment is lower than that at the first moment; however, a comparison result between CG1 and CG2 at the second moment is the same as that at the first moment.

If there is no transmittable data of CG1 at the second moment, for example, the data 1 of CG1 has been sent by using another uplink grant before the second moment, a PUSCH without transmittable data is determined as low priority according to protocol prescription or network configuration. In this case, the priority of CG1 at the second moment is lower than that at the first moment, and the priority of CG2 at the second moment is higher than that of CG1. It can be learned that, in this case, not only the priority of CG1 at the second moment is lower than that at the first moment, but also a comparison result between CG1 and CG2 at the second moment is different from that at the first moment.

In a case that the priority of an uplink signal under transmission collision having changed includes (c), priority of at least one of the third uplink signal and the fourth uplink signal at the second moment has changed relative to that of the at least one uplink signal at the first moment.

In addition, because a comparison result between the priorities of the third uplink signal and the fourth uplink signal at the second moment in (c) is different from that at the first moment. Therefore, in this case, the comparison result between the priorities of the N uplink signals at the second moment is surely different from that at the first moment.

Further, the third uplink signal or the fourth uplink signal may be the highest-priority uplink signal in the N uplink signals. That is, an uplink transmission determined as low priority at the first moment in the N uplink signals has a priority at the second moment higher than an uplink transmission determined as the highest priority at the first moment; or an uplink transmission determined as the highest priority at the first moment in the N uplink signals has a priority at the second moment lower than an uplink transmission determined as low priority at the first moment. In this way, the terminal may perform the $(i+1)^{th}$ operation only in a case that priority of the highest-priority uplink signal in the N uplink signals has changed, thereby reducing operating burden of the terminal.

For ease of understanding, descriptions are provided by using an example.

It is assumed that the N uplink signals include CG1 and CG2. It is also assumed that at the first moment, transmittable data of CG1 includes data 1, transmittable data of CG2 includes data 2, priority of data 1>priority of data 2, and priority of CG1 is higher than priority of CG2 at the first moment.

If data 3 is newly added to the transmittable data of CG2 before the second moment, and priority of data 3 is higher than the priority of data 1. Because the priority of data 3>the priority of data 1>the priority of data 2, the priority of CG2 is higher than the priority of CG1 at the second moment. In this case, only the priority of CG2 has changed.

If there is no transmittable data of CG1 at the second moment, for example, data 1 of CG1 has been sent by using another uplink grant before the second moment, the priority of CG2 is higher than the priority of CG1 at the second moment. In this case, only the priority of CG1 has changed.

If the transmittable data of CG1 at the second moment includes data 4, for example, data 1 of CG1 has been sent by using another uplink grant before the second moment and data 4 has been added to the transmittable data of CG1 before the second moment, data 3 has been added to the transmittable data of CG2 before the second moment, and priority of data 3>the priority of data 2>priority of data 4, then the priority of CG2 is higher than the priority of CG1 at the second moment. In this case, the priorities of both CG1 and CG2 have changed.

When the first condition satisfies a scenario 2 with the number of uplink signals under transmission collision being changed, optionally, the number of uplink signals under transmission collision having changed may be specifically implemented as at least one of the following:

(d) transmission of a fifth uplink signal in the N uplink signals has been cancelled before the second moment; and (e) a sixth uplink signal is newly added before the second moment, and the sixth uplink signal does not belong to the N uplink signals.

Details are described as follows:

In a case that the number of uplink signals under transmission collision having changed includes (d), the number of uplink signals under transmission collision at the second moment is reduced compared to the number of uplink signals under transmission collision at the first moment.

Further, the fifth uplink signal may be any uplink signal in the N uplink signals other than the highest-priority uplink signal. That is, in the N uplink signals, the fifth uplink signal determined as the highest priority at the first moment has been cancelled before the second moment. Because the at least one uplink signal is having a transmission collision, the terminal selects to send the highest-priority uplink signal in the at least one uplink signal. Therefore, if an uplink signal in the N uplink signals other than the highest-priority uplink signal has been cancelled before the second moment, even if the terminal performs the $(i+1)^{th}$ comparison operation, the highest-priority uplink signal determined by the terminal may remain unchanged. In this way, the terminal may perform the $(i+1)^{th}$ operation only in a case that transmission of the highest-priority uplink signal in the N uplink signals has been cancelled, thereby reducing operating burden of the terminal.

For ease of understanding, descriptions are provided by using an example.

It is assumed that the N uplink signals include CG1, CG2, and CG3. It is also assumed that at the first moment, transmittable data of CG1 includes data 1, transmittable data of CG2 includes data 2, transmittable data of CG3 includes data 3, and priority of data 1>priority of data 2>priority of data 3. Then, at the first moment, priority of CG1>priority of CG2>priority of CG3.

If there is no transmittable data of CG1 at the second moment, for example, data 1 has been sent by using another uplink grant before the second moment, transmission of CG1 may be considered to be canceled in this case, then the terminal may compare only priorities of CG2 and CG3 at the second moment. It can be learned that in this case, the number of uplink signals under transmission collision is reduced.

In a case that the number of uplink signals under transmission collision having changed includes (e), the number of uplink signals under transmission collision at the second moment is increased compared to the number of uplink signals under transmission collision at the first moment.

For ease of understanding, descriptions are provided by using an example.

It is assumed that the N uplink signals include CG1 and CG2. It is also assumed that at the first moment, transmittable data of CG1 includes data 1, transmittable data of CG2 includes data 2, and priority of data 1>priority of data 2. Then, priority of CG1>priority of CG2 at the first moment.

CG3 is added before the second moment, and transmittable data of CG3 includes data 3. Then, at the second moment, the terminal may compare priorities of CG1, CG2, and CG3. It can be learned that in this case, the number of uplink signals under transmission collision is reduced.

The following describes timing for performing the $(i+1)^{th}$ comparison operation when the terminal satisfies the first condition.

Optionally, if the first condition is satisfied, the performing the $(i+1)^{th}$ comparison operation includes:
if the first condition is satisfied, performing the $(i+1)^{th}$ comparison operation at or before a third moment; where
there is an interval $T_1$ between the third moment and a first sending moment of a first target uplink signal in M uplink signals, and the third moment is earlier than the first sending moment, and the M uplink signals are uplink signals under transmission collision at an execution moment of the $(i+1)^{th}$ comparison operation.

During specific implementation, the first target uplink signal may be any uplink signal in the M uplink signals.

The sending moment of the first target uplink signal is denoted by t. If the first condition is satisfied, the terminal may perform the $(i+1)^{th}$ comparison operation at a time point earlier than or equal to $(t-T_1)$. It should be understood that the third moment is located after the first moment.

Optionally, a value of $T_1$ is any one of the following: a processing duration of the first target uplink signal and a first preset duration.

The first preset duration may be set according to actual needs, which is not limited herein.

In practical application, $T_1$ may be configured by the network-side device or predetermined by the protocol.

In a case that $T_1$ is configured by the network-side device, optionally, if the first condition is satisfied, before the performing the $(i+1)^{th}$ comparison operation at or before the third moment, the method further includes:
receiving fourth indication information sent by the network-side device, where the fourth indication information is used to indicate the value of $T_1$.

In the embodiment shown in FIG. 1, P is less than or equal to K, and K is a maximum number of comparison operations that the terminal is allowed to perform. However, in practical application, the number of comparison operations actually performed by the terminal may be less than or equal to K.

Optionally, the value of K is configured by the network-side device or prescribed by the protocol.

In a case that the value of K is configured by the network-side device, optionally, before the performing P comparison operations in a case that at least one uplink signal is having a transmission collision, the method further includes:
receiving second indication information sent by the network-side device, where the second indication information is used to indicate the value of K.

In some implementations, optionally, the second indication information is used to indicate a value of K−1. In this case, the second indication information is used to indicate the maximum number of comparison operations that the terminal is allowed to perform again.

In the embodiment shown in FIG. 1, optionally, after the performing P comparison operations, the method further includes:
sending a second target uplink signal, where the second target uplink signal is a highest-priority uplink signal in a comparison result of the $P^{th}$ comparison operation.

In this way, in the case that at least one uplink signal is having a transmission collision, the terminal may perform P comparison operations before the sending time of the at least one uplink signal, and send an uplink signal with the highest priority in a comparison result of the $P^{th}$ comparison operation. It can be ensured that the highest-priority uplink signal in the uplink signals under transmission collision is sent out, thereby reducing transmission delays of high-priority uplink signals and further improving transmission reliability.

Referring to FIG. 2, FIG. 2 is a second flowchart of a transmission priority processing method according to an embodiment of the present invention. The transmission priority processing method in this embodiment of the present invention is applied to a terminal. As shown in FIG. 2, the transmission priority processing method may include the following steps.

Step 201: In a case that at least one uplink signal is having a transmission collision, perform a first comparison operation on priority of the at least one uplink signal at a fourth moment; where an interval T2 is present between the fourth moment and a second sending moment of a third target uplink signal in the at least one uplink signal, and the fourth moment is earlier than the second sending moment.

During specific implementation, the third target uplink signal may be any uplink signal in the at least one uplink signals.

The sending moment of the third target uplink signal is denoted by t. In this embodiment, the terminal may perform the first comparison operation at a time point of $(t-T_2)$, and skips performing the first comparison operation at a time point earlier than $(t-T_2)$.

For ease of understanding, descriptions are provided by using an example.

UE receives a DG at a moment t0, a sending time of the DG is t, transmission of a DG PUSCH collides with that of a CG PUSCH, and a processing time of the PUSCH is $T_{process}$. In this case, the UE skips performing priority judgment after receiving the DG (or skips generating a MAC PDU corresponding to the DG/CG PUSCH), and performs priority judgment (or generates a MAC PDU corresponding to the DG/CG PUSCH) only at a time of $(t-T_{process})$.

In practical application, the behavior of performing a first comparison operation on priority of the at least one uplink signal at a fourth moment in a case that at least one uplink signal is having a transmission collision may be configured by a network-side device or prescribed by a protocol.

Before the behavior is configured by the network side, before the performing a first comparison operation on priority of the at least one uplink signal at a fourth moment in a case that at least one uplink signal is having a transmission collision, the method further includes:

receiving third indication information sent by the network-side device, where the third indication information is used to indicate that the terminal performs the first comparison operation on the priority of the at least one uplink signal at the fourth moment in the case that the at least one uplink signal is having a transmission collision; where an interval T2 is present between the fourth moment and a second sending moment of a third target uplink signal in the at least one uplink signal, and the fourth moment is earlier than the second sending moment.

In the transmission priority processing method in this embodiment, in the case that the at least one uplink signal is having a transmission collision, the first comparison operation is performed on the priority of the at least one uplink signal at the fourth moment; where an interval T2 is present between the fourth moment and the second sending moment of the third target uplink signal in the at least one uplink signal, and the fourth moment is earlier than the second sending moment. In this way, timing at which the terminal performs the first comparison operation is stipulated, thereby improving reliability of uplink signal transmission.

In the embodiment shown in FIG. 2, optionally, the value of $T_2$ is any one of the following: a processing duration of the third target uplink signal and a second preset duration.

The second preset duration may be set according to actual needs, which is not limited herein.

In practical application, $T_2$ may be configured by the network-side device or predetermined by the protocol.

In a case that $T_2$ is configured by the network-side device, optionally, before the performing a first comparison operation on priority of the at least one uplink signal at a fourth moment in a case that at least one uplink signal is having a transmission collision, the method further includes:

receiving fifth indication information sent by the network-side device, where the fifth indication information is used to indicate the value of $T_2$.

In the embodiment shown in FIG. 2, optionally, after the performing a first comparison operation on priority of the at least one uplink signal at a fourth moment, the method further includes:

sending a fourth target uplink signal, where the fourth target uplink signal is a highest-priority uplink signal in a comparison result of the first comparison operation.

In this way, in the case that at least one uplink signal is having a transmission collision, the terminal sends an uplink signal with the highest priority in the comparison result of the first comparison operation. It can be ensured that the highest-priority uplink signal in the uplink signals under transmission collision is sent out, thereby reducing transmission delays of high-priority uplink signals and further improving transmission reliability.

In the embodiment shown in FIG. 2, optionally, the uplink signals under transmission collision include at least one of the following signal types: physical random access channel PRACH signal, physical uplink control channel PUCCH signal, physical uplink shared channel PUSCH signal, and sounding reference signal SRS.

For details, refer to description of related content of FIG. 2. Details are not described herein again.

It should be noted that, in practical application, the method embodiment of FIG. 1 and the method embodiment of FIG. 2 may be implemented independently or in combination. In a case of combination of the embodiments, the $1^{st}$ comparison operation in the P comparison operations in the method embodiment of FIG. 1 may be considered as the first comparison operation in the method embodiment of FIG. 2. For specific implementation principles, reference may be made to the foregoing description, which is not repeated herein.

Referring to FIG. 3, FIG. 3 is a third flowchart of a transmission priority processing method according to an embodiment of the present invention. The transmission priority processing method in this embodiment of the present invention is applied to a network-side device. In actual application, the network-side device may be a base station, a relay, an access point, or the like.

As shown in FIG. 3, the transmission priority processing method may include the following steps.

Step 301: Send first indication information to a terminal, where the first indication information is used to indicate that the terminal performs P comparison operations in a case that at least one uplink signal is having a transmission collision, where the $i^{th}$ comparison operation is used to compare priorities of N uplink signals under transmission collision at a first moment, the first moment is an execution moment of the $i^{th}$ comparison operation, a value of i ranges from 1 to P, P is a positive integer less than or equal to K, and both K and N are integers greater than 1.

In the transmission priority processing method in this embodiment, the network-side device sends the first indication information to the terminal, where the first indication information is used to indicate that the terminal performs P comparison operations in the case that the at least one uplink signal is having a transmission collision, where the $i^{th}$ comparison operation is used to compare the priorities of the N uplink signals under transmission collision at the first moment, the first moment is an execution moment of the $i^{th}$ comparison operation, the value of i ranges from 1 to P, P is a positive integer less than or equal to K, and both K and N are integers greater than 1. In this way, in the case that at least one uplink signal is having a transmission collision, the terminal may perform P comparison operations, thereby improving flexibility in priority judgment on uplink signals and further improving reliability of uplink signal transmission.

Optionally, the first indication information is specifically used to indicate that the terminal performs the $(i+1)^{th}$ comparison operation if a first condition is satisfied in a case that the terminal has performed the $i^{th}$ comparison operation, where the first condition satisfies at least one of the following:

priorities of uplink signals under transmission collision being changed; and the number of uplink signals under transmission collision being changed.

Optionally, the priority of an uplink signal under transmission collision having changed includes at least one of the following:

priority of a first uplink signal in the N uplink signals at a second moment is higher than priority of the first uplink signal at the first moment;

priority of a second uplink signal in the N uplink signals at the second moment is lower than the priority of the first uplink signal at the first moment; and a first comparison result is different from a second comparison result, where the first comparison result is a comparison result between priorities of a third uplink signal and a fourth uplink signal in the N uplink signals at the first moment, and the second comparison result is a comparison result between priorities of the third uplink signal and the fourth uplink signal at the second moment; where the second moment is an execution time of the $(i+1)^{th}$ comparison operation.

Optionally, the first indication information is specifically used to indicate that the terminal performs the $(i+1)^{th}$ comparison operation at or before a third moment if the first condition is satisfied in the case that the terminal has performed the $i^{th}$ comparison operation; where there is an interval $T_1$ between the third moment and a first sending moment of a first target uplink signal in M uplink signals, and the third moment is earlier than the first sending moment, and the M uplink signals are uplink signals under transmission collision at an execution moment of the $(i+1)^{th}$ comparison operation.

Optionally, a value of $T_1$ is any one of the following: a processing duration of the first target uplink signal and a first preset duration.

Optionally, the method further includes:

sending second indication information to the terminal, where the second indication information is used to indicate a value of K.

Optionally, after the sending first indication information to a terminal, the method includes:

receiving a second target uplink signal sent by the terminal, where the second target uplink signal is a highest-priority uplink signal in a comparison result of the $P^{th}$ comparison operation.

Optionally, the uplink signals under transmission collision include at least one of the following signal types: physical random access channel PRACH signal, physical uplink control channel PUCCH signal, physical uplink shared channel PUSCH signal, and sounding reference signal SRS.

It should be noted that this embodiment is used as an implementation of the network-side device corresponding to the foregoing method embodiment in FIG. 1. Therefore, reference may be made to the related description in the foregoing method embodiment, and the same beneficial effects can be achieved. To avoid repetition, details are not described herein again.

Referring to FIG. 4, FIG. 4 is a third flowchart of a transmission priority processing method according to an embodiment of the present invention. The transmission priority processing method in this embodiment of the present invention is applied to a network-side device. In actual application, the network-side device may be a base station, a relay, an access point, or the like.

As shown in FIG. 4, the transmission priority processing method may include the following steps.

Step 401: Send third indication information to a terminal, where the third indication information is used to indicate that the terminal performs a first comparison operation on priority of at least one uplink signal at a fourth moment in a case that the at least one uplink signal is having a transmission collision; where an interval T2 is present between the fourth moment and a second sending moment of a third target uplink signal in the at least one uplink signal, and the fourth moment is earlier than the second sending moment.

In the transmission priority processing method in this embodiment, the network-side device sends the third indication information to the terminal, where the third indication information is used to indicate that the terminal performs the first comparison operation on the priority of the at least one uplink signal at the fourth moment in the case that the at least one uplink signal is having a transmission collision; where an interval T2 is present between the fourth moment and the second sending moment of the third target uplink signal in the at least one uplink signal, and the fourth moment is earlier than the second sending moment. In this way, in the case that at least one uplink signal is having a transmission collision, the terminal may perform the first comparison operation on the priority of the at least one uplink signal at the fourth moment, thereby standardizing timing of performing the first comparison operation by the terminal and further improving reliability of uplink signal transmission.

Optionally, a value of $T_2$ is any one of the following: a processing duration of the third target uplink signal and a second preset duration.

Optionally, after the sending third indication information to a terminal, the method further includes:

receiving a fourth target uplink signal, where the fourth target uplink signal is a highest-priority uplink signal in a comparison result of the first comparison operation.

Optionally, the uplink signals under transmission collision include at least one of the following signal types: physical random access channel PRACH signal, physical uplink control channel PUCCH signal, physical uplink shared channel PUSCH signal, and sounding reference signal SRS.

It should be noted that this embodiment is used as an implementation of the network-side device corresponding to the foregoing method embodiment in FIG. 2. Therefore, reference may be made to the related description in the foregoing method embodiment, and the same beneficial effects can be achieved. To avoid repetition, details are not described herein again.

Various optional implementations described in the embodiment of the present invention may be implemented in combination with each other under the condition that they do not conflict with each other or may be implemented independently, which is not limited in the embodiments of the present invention.

Embodiment 1 of the Present Invention: Performing Judgment on Transmissions for a Plurality of Times When a specific uplink signal of the UE has a transmission collision and is determined as low priority through comparison, according to the network configuration or protocol prescription, after the priority of the uplink transmission has changed, the UE is allowed to perform judgment again to use the uplink transmission.

Optionally, a type of the specific uplink signal may include but is not limited to any one of the following:

physical random access channel (PRACH), for example, PRACH transmission triggered by arrival of uplink data on a specific logical channel;

physical uplink control channel (PUCCH), for example, SR transmission;

physical uplink shared channel (PUSCH), for example, PUSCH transmission corresponding to CG or DG; and sounding reference signal (SRS), for example, transmission of a specific type of SRS, where the specific type of SRS may be an SRS used for calculating uplink timing advance (TA), which is not limited thereto.

Optionally, according to rules in the configuration of the network side or prescription of the protocol, if the UE is allowed to perform judgment again to use the uplink transmission, and the uplink transmission is allowed, the UE generates a corresponding uplink transmission.

Further, the rules in the configuration of the network side or prescription of the protocol for allowing the UE to perform judgment again to use the uplink transmission include any one of the following:

(1) Priority of a transmission previously determined to have low priority becomes higher.

Example 1: DG-1 (or SR-1) has a higher priority than CG-1 at moment 1; and the priority of CG-1 becomes higher at moment 2. For example, there is no transmittable data of CG-1 (according to the protocol prescription or network configuration, a PUSCH without transmittable data is determined as low priority) at moment 1, and there is transmittable data of CG-1 at moment 2; or priority of data for uplink transmission corresponding to CG-1 is lower at moment 1, and the priority of the data for uplink transmission corresponding to CG-1 at moment 2 becomes higher (for example, there is data of a higher priority for transmission).

Example 2: DG-1 (or CG-1) has a higher priority than SR-1 at moment 1, and the priority of SR-1 becomes higher at moment 2. For example, transmission of SR-1 is triggered by a low-priority logical channel at moment 1, and transmission of SR-1 is triggered by a high-priority logical channel at moment 2.

(2) Priority of a transmission previously determined to have high priority becomes lower.

Example 1: CG-1 has a higher priority than DG-1 (or SR-1) at moment 1, and the priority of CG-1 becomes lower at moment 2. For example, priority of data for uplink transmission corresponding to CG-1 is high at moment 1 and there is no transmittable data of CG-1 at moment 2 (for example, data of CG-1 previously determined as high priority has been sent by using another uplink grant before CG-1 is sent; and according to the protocol prescription or network configuration, a PUSCH without transmittable data is determined as low priority).

Example 2: CG-1 has a higher priority than DG-1 (or SR-1) at moment 1; and priority of data for uplink transmission corresponding to CG-1 becomes lower at moment 2. For example, priority of data for uplink transmission corresponding to CG-1 is high at moment 1, and high-priority data of CG-1 previously determined before moment 2 to have high-priority data for sending has been sent by using another uplink grant before CG-1 is sent. Therefore, only low-priority data is to be still sent by using the CG-1.

Example 3: SR-1 has a higher priority than DG-1 (or CG-1) at moment 1; and priority of SR-1 becomes lower at moment 2. For example, transmission of SR-1 is triggered by a high-priority logical channel at moment 1, and the transmission of SR-1 triggered by the high-priority logical channel has been canceled before moment 2 (for example, data of the high-priority logical channel data has been sent), and transmission of SR-1 is triggered by a lower-priority logical channel again.

(3) Transmission previously determined to have high priority has been cancelled.

Example 1: CG-1 has a higher priority than DG-1 (or SR-1) at moment 1; and there is no transmittable data of CG-1 at moment 2. For example, priority of data for uplink transmission corresponding to CG-1 is high at moment 1, and there is no transmittable data of CG-1 at moment 2 (for example, data of CG-1 previously determined to have high-priority data for sending has been sent by using another uplink grant before CG-1 is sent).

Example 2: SR-1 has a higher priority than DG-1 (or CG-1) at moment 1; and SR-1 has been cancelled at moment 2. For example, transmission of SR-1 is triggered by a high-priority logical channel at moment 1, and the transmission of SR-1 triggered by the high-priority logical channel has been canceled before moment 2 (for example, data of the high-priority logical channel data has been sent, or a buffer status report (BSR) corresponding to the high-priority logical channel has been reported).

(4) Priority of a transmission previously determined to have low priority is higher than that of "a transmission previously determined to have high priority" under collision.

For example, DG-1 (SR-1) has a higher priority than CG-1 at moment 1 (for example, there is no transmittable data of CG-1; or priority of data for uplink transmission corresponding to CG-1 is low); the priority of CG-1 and/or DG-1 (or SR-1) has changed at moment 2, and DG-1 (or SR-1) has a lower priority than CG-1.

(5) Priority of a transmission previously determined to have high priority is lower than that of "a transmission previously determined to have low priority" under collision.

For example, CG-1 has a higher priority than DG-1 (or SR-1) at moment 1 (for example, priority of data for uplink transmission corresponding to CG-1 is high); the priority of CG-1 and/or DG-1 (or SR-1) has changed at moment 2, and DG-1 (or SR-1) has a higher priority than CG-1.

In addition, according to the network-side configuration or the protocol prescription, after the priority of the uplink transmission has changed, the UE is allowed to perform judgment again on the number of times of using the uplink transmission. For example, according to the network-side configuration or the protocol prescription, the UE is allowed to perform judgment again once.

In addition, according to the network-side configuration or the protocol prescription, after the priority of the uplink transmission has changed, the UE is allowed to perform judgment again before a time defined in the network-side configuration or the protocol prescription to use the uplink transmission. Optionally, the time point may include any one of the following:

being before a processing time of the uplink transmission, where, for example, a sending time point of a CG PUSCH is t1 and a processing time of the CG PUSCH is $T_{process}$, then the time point is at a time point earlier than or equal to (t1−$T_{process}$); and being before a fixed time point configured by the network or prescribed by the protocol, where, for example, a sending time point of a CG PUSCH is t1 and a fixed time point configured by the network or prescribed by the protocol is T, then the time point is at a time point earlier than or equal to (t1−T).

Embodiment 2 of the Present Invention: Determining a Specific Time Point

Step 1: The network side configures or the protocol prescribes a time at which the UE performs priority judgment on uplink transmission. Optionally, the time includes any one of the following:

being before a processing time of the uplink transmission, where, for example, a sending time point of a PUSCH/PUCCH is t1 and a processing time of the PUSCH/PUCCH is $T_{process}$, then the time point is equal to a time of (t1−$T_{process}$); and a fixed time point configured by the network or prescribed by the protocol, where, for example, a sending time point of a PUSCH/PUCCH is t1 and a fixed time point configured by the network or prescribed by the protocol is T, then the time point is equal to a time of (t1−T).

Step 2: According to step 1, during priority judgment on uplink transmissions under collision by the UE, the UE performs judgment only when the time configured by the network or prescribed by the protocol arrives.

Example 1: The UE receives a DG at a moment t, a sending time of the DG is t1, transmission of a DG PUSCH collides with that of a CG PUSCH, and a processing time of the PUSCH is $T_{process}$. In this case, the UE skips performing priority judgment after receiving the DG (or skips generating a MAC PDU corresponding to the DG/CG PUSCH), and performs priority judgment (or generates a MAC PDU corresponding to the DG/CG PUSCH) only at a time of ($t1-T_{process}$).

Example 2: The UE receives a DG at a moment t, a sending time of the DG is t1, transmission of a DG PUSCH collides with that of a CG PUSCH, and a fixed time configured by the network or prescribed by the protocol is T. In this case, the UE skips performing priority judgment after receiving the DG (or skips generating a MAC PDU corresponding to the DG/CG PUSCH), and performs priority judgment (or generates a MAC PDU corresponding to the DG/CG PUSCH) only at a time of (t1−T).

In this embodiment of the present invention, in one implementation, when priorities of one or more uplink transmissions have changed, it is allowed to perform judgment on the priorities of the uplink transmissions for a plurality of times; in another implementation, judgment on the priorities of the uplink transmissions is limited to being performed at a specific time point, and judgment on the priorities of the uplink transmissions is not performed before this time point.

In this embodiment of the present invention, an uplink grant determined as low priority can be used again when high-priority data arrives, so as to send the high-priority data as soon as possible, thereby reducing transmission delay of high-priority data.

Referring to FIG. 5, FIG. 5 is a first structural diagram of a terminal according to an embodiment of the present invention. As shown in FIG. 5, the terminal 500 includes:
a first operation module 501, configured to: perform P comparison operations in a case that at least one uplink signal is having a transmission collision, where the $i^{th}$ comparison operation is used to compare priorities of N uplink signals under transmission collision at a first moment, the first moment is an execution moment of the $i^{th}$ comparison operation, a value of i ranges from 1 to P, P is a positive integer less than or equal to K, and both K and N are integers greater than 1.

Optionally, the first operation module 501 is specifically configured to:
in a case that the $i^{th}$ comparison operation has been performed, performing the $(i+1)^{th}$ comparison operation if a first condition is satisfied, where the first condition being satisfied includes at least one of the following:
priorities of uplink signals under transmission collision being changed; and
the number of uplink signals under transmission collision being changed.

Optionally, the priority of an uplink signal under transmission collision having changed includes at least one of the following:
priority of a first uplink signal in the N uplink signals at a second moment is higher than priority of the first uplink signal at the first moment;
priority of a second uplink signal in the N uplink signals at the second moment is lower than the priority of the first uplink signal at the first moment; and
a first comparison result is different from a second comparison result, where the first comparison result is a comparison result between priorities of a third uplink signal and a fourth uplink signal in the N uplink signals at the first moment, and the second comparison result is a comparison result between priorities of the third uplink signal and the fourth uplink signal at the second moment; where
the second moment is an execution time of the $(i+1)^{th}$ comparison operation.

Optionally, the first operation module 501 is specifically configured to:
perform the $(i+1)^{th}$ comparison operation at or before a third moment if the first condition is satisfied in the case that the terminal has performed the $i^{th}$ comparison operation; where
there is an interval $T_1$ between the third moment and a first sending moment of a first target uplink signal in M uplink signals, and the third moment is earlier than the first sending moment, and the M uplink signals are uplink signals under transmission collision at an execution moment of the $(i+1)^{th}$ comparison operation.

Optionally, a value of $T_1$ is any one of the following: a processing duration of the first target uplink signal and a first preset duration.

Optionally, the value of K is configured by the network-side device or prescribed by a protocol.

Optionally, the terminal 500 further includes:
a first sending module, configured to send a second target uplink signal, where the second target uplink signal is a highest-priority uplink signal in a comparison result of the $P^{th}$ comparison operation.

Optionally, the uplink signals under transmission collision include at least one of the following signal types: physical random access channel PRACH signal, physical uplink control channel PUCCH signal, physical uplink shared channel PUSCH signal, and sounding reference signal SRS.

The terminal 500 is capable of implementing the processes implemented by the terminal in the method embodiment in FIG. 1, with the same beneficial effects achieved. To avoid repetition, details are not described herein again.

Referring to FIG. 6, FIG. 6 is a first structural diagram of a terminal according to an embodiment of the present invention. As shown in FIG. 6, the terminal 600 includes:
a second operation module 601, configured to: in a case that at least one uplink signal is having a transmission collision, performing a first comparison operation on priority of the at least one uplink signal at a fourth moment; where
an interval T2 is present between the fourth moment and a second sending moment of a third target uplink signal in the at least one uplink signal, and the fourth moment is earlier than the second sending moment.

Optionally, a value of $T_2$ is any one of the following: a processing duration of the third target uplink signal and a second preset duration.

Optionally, the terminal 600 further includes:
a second sending module, configured to send a fourth target uplink signal, where the fourth target uplink signal is a highest-priority uplink signal in a comparison result of the first comparison operation.

Optionally, the uplink signals under transmission collision include at least one of the following signal types: physical random access channel PRACH signal, physical uplink control channel PUCCH signal, physical uplink shared channel PUSCH signal, and sounding reference signal SRS.

The terminal 600 is capable of implementing the processes implemented by the terminal in the method embodiment in FIG. 2, with the same beneficial effects achieved. To avoid repetition, details are not described herein again.

Referring to FIG. 7, FIG. 7 is a first structural diagram of a network-side device according to an embodiment of the present invention. As shown in FIG. 7, the network-side device 700 includes:

a third sending module 701, configured to send first indication information to a terminal, where the first indication information is used to indicate that the terminal performs P comparison operations in a case that at least one uplink signal is having a transmission collision, where the $i^{th}$ comparison operation is used to compare priorities of N uplink signals under transmission collision at a first moment, the first moment is an execution moment of the $i^{th}$ comparison operation, a value of i ranges from 1 to P, P is a positive integer less than or equal to K, and both K and N are integers greater than 1.

Optionally, the first indication information is specifically used to indicate that the terminal performs the $(i+1)^{th}$ comparison operation if a first condition is satisfied in a case that the terminal has performed the $i^{th}$ comparison operation, where the first condition satisfies at least one of the following:

priorities of uplink signals under transmission collision being changed; and the number of uplink signals under transmission collision being changed.

Optionally, the priority of an uplink signal under transmission collision having changed includes at least one of the following:

priority of a first uplink signal in the N uplink signals at a second moment is higher than priority of the first uplink signal at the first moment;

priority of a second uplink signal in the N uplink signals at the second moment is lower than the priority of the first uplink signal at the first moment; and a first comparison result is different from a second comparison result, where the first comparison result is a comparison result between priorities of a third uplink signal and a fourth uplink signal in the N uplink signals at the first moment, and the second comparison result is a comparison result between priorities of the third uplink signal and the fourth uplink signal at the second moment; where the second moment is an execution time of the $(i+1)^{th}$ comparison operation.

Optionally, the first indication information is specifically used to indicate that the terminal performs the $(i+1)^{th}$ comparison operation at or before a third moment if the first condition is satisfied in the case that the terminal has performed the $i^{th}$ comparison operation; where there is an interval $T_1$ between the third moment and a first sending moment of a first target uplink signal in M uplink signals, and the third moment is earlier than the first sending moment, and the M uplink signals are uplink signals under transmission collision at an execution moment of the $(i+1)^{th}$ comparison operation.

Optionally, a value of $T_1$ is any one of the following: a processing duration of the first target uplink signal and a first preset duration.

Optionally, the network-side device 700 further includes:

a fourth sending module, configured to send second indication information to the terminal, where the second indication information is used to indicate a value of K.

Optionally, the network-side device 700 further includes:

a first receiving module, configured to receive a second target uplink signal sent by the terminal, where the second target uplink signal is a highest-priority uplink signal in a comparison result of the $P^{th}$ comparison operation.

Optionally, the uplink signals under transmission collision include at least one of the following signal types: physical random access channel PRACH signal, physical uplink control channel PUCCH signal, physical uplink shared channel PUSCH signal, and sounding reference signal SRS.

The network-side device 700 is capable of implementing the processes implemented by the network-side device in the method embodiment of FIG. 3, with the same beneficial effects achieved. To avoid repetition, details are not described herein again.

Figure 8:
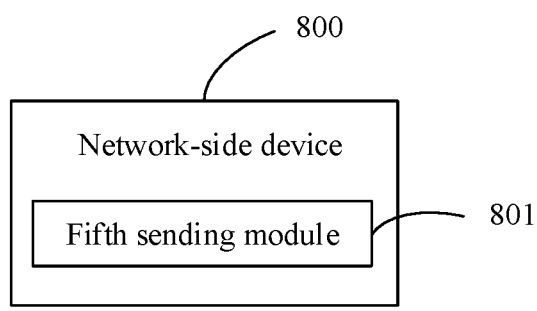
FIG. 8 is a second structural diagram of a network-side device according to an embodiment of the present invention.

Referring to FIG. 8, FIG. 8 is a second structural diagram of a network-side device according to an embodiment of the present invention. As shown in FIG. 8, the network-side device 800 includes:

a fifth sending module 801, configured to: send third indication information to a terminal, where the third indication information is used to indicate that the terminal performs a first comparison operation on priority of at least one uplink signal at a fourth moment in a case that the at least one uplink signal is having a transmission collision; where an interval T2 is present between the fourth moment and a second sending moment of a third target uplink signal in the at least one uplink signal, and the fourth moment is earlier than the second sending moment.

Optionally, a value of $T_2$ is any one of the following: a processing duration of the third target uplink signal and a second preset duration.

Optionally, the network-side device 800 further includes:

a second receiving module, configured to receive a fourth target uplink signal, where the fourth target uplink signal is a highest-priority uplink signal in a comparison result of the first comparison operation.

Optionally, the uplink signals under transmission collision include at least one of the following signal types: physical random access channel PRACH signal, physical uplink control channel PUCCH signal, physical uplink shared channel PUSCH signal, and sounding reference signal SRS.

The network-side device 800 is capable of implementing the processes implemented by the network-side device in the method embodiment of FIG. 4, with the same beneficial effects achieved. To avoid repetition, details are not described herein again.

Figure 9:
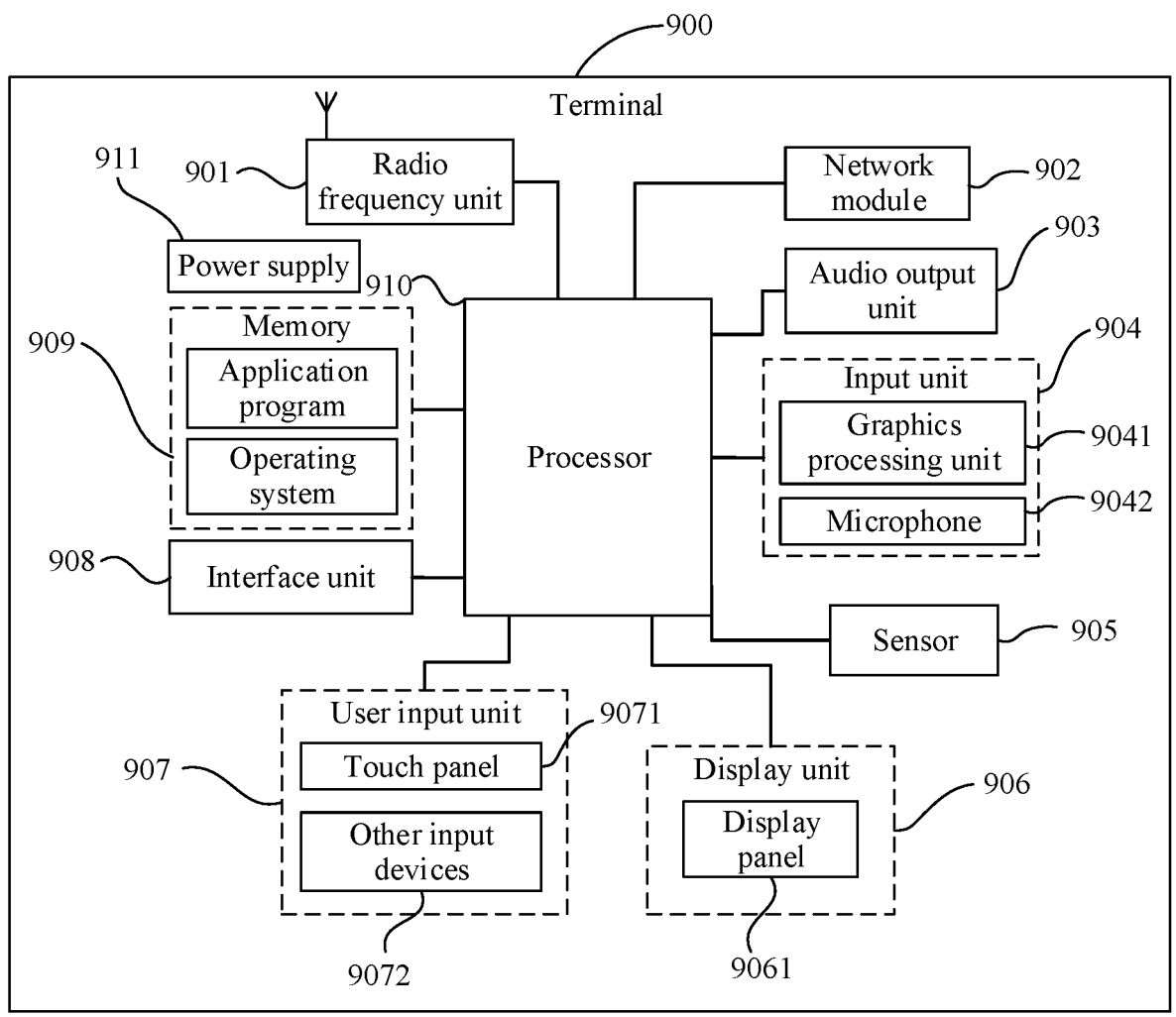
FIG. 9 is a third structural diagram of a terminal according to an embodiment of the present invention.

Referring to FIG. 9, FIG. 9 is a third structural diagram of a terminal according to an embodiment of the present invention. The terminal may have a schematic diagram of a hardware structure of a terminal for implementing the embodiments of the present invention. As shown in FIG. 9, the terminal 900 includes but is not limited to components such as a radio frequency unit 901, a network module 902, an audio output unit 903, an input unit 904, a sensor 905, a display unit 906, a user input unit 907, an interface unit 908, a memory 909, a processor 910, and a power supply 911. A person skilled in the art may understand that the structure of the terminal shown in FIG. 9 does not constitute any limitation on the terminal device. The terminal may include more or fewer components than those shown in the figure, or a combination of some components, or the components disposed differently. In this embodiment of the present invention, the terminal includes, but is not limited to, a mobile phone, a tablet computer, a laptop computer, a personal digital assistant, an in-vehicle terminal, a wearable device, a pedometer, and the like.

Case 1: The terminal 900 is capable of implementing the processes of the method embodiment in FIG. 1.

The processor 910 is configured to:

perform P comparison operations in a case that at least one uplink signal is having a transmission collision, where the $i^{th}$ comparison operation is used to compare priorities of N uplink signals under transmission collision at a first moment, the first moment is an execution moment of the $i^{th}$ comparison operation, a value of i ranges from 1 to P, P is a positive integer less than or equal to K, and both K and N are integers greater than 1.

Optionally, the processor 910 is specifically configured to:

in a case that the $i^{th}$ comparison operation has been performed, performing the $(i+1)^{th}$ comparison operation if a first condition is satisfied, where the first condition being satisfied includes at least one of the following:

priorities of uplink signals under transmission collision being changed; and the number of uplink signals under transmission collision being changed.

Optionally, the priority of an uplink signal under transmission collision having changed includes at least one of the following:

priority of a first uplink signal in the N uplink signals at a second moment is higher than priority of the first uplink signal at the first moment;

priority of a second uplink signal in the N uplink signals at the second moment is lower than the priority of the first uplink signal at the first moment; and a first comparison result is different from a second comparison result, where the first comparison result is a comparison result between priorities of a third uplink signal and a fourth uplink signal in the N uplink signals at the first moment, and the second comparison result is a comparison result between priorities of the third uplink signal and the fourth uplink signal at the second moment; where the second moment is an execution time of the $(i+1)^{th}$ comparison operation.

Optionally, the process 910 is specifically configured to perform the $(i+1)^{th}$ comparison operation at or before a third moment if the first condition is satisfied in the case that the terminal has performed the $i^{th}$ comparison operation; where there is an interval $T_1$ between the third moment and a first sending moment of a first target uplink signal in M uplink signals, and the third moment is earlier than the first sending moment, and the M uplink signals are uplink signals under transmission collision at an execution moment of the $(i+1)^{th}$ comparison operation.

Optionally, a value of $T_1$ is any one of the following: a processing duration of the first target uplink signal and a first preset duration.

Optionally, the value of K is configured by the network-side device or specified by a protocol.

Optionally, the radio frequency unit 901 is configured to send a second target uplink signal, where the second target uplink signal is a highest-priority uplink signal in a comparison result of the $P^{th}$ comparison operation.

Optionally, the uplink signals under transmission collision include at least one of the following signal types: physical random access channel PRACH signal, physical uplink control channel PUCCH signal, physical uplink shared channel PUSCH signal, and sounding reference signal SRS.

It should be noted that the terminal 900 in case 1 is capable of implementing the processes of the method embodiment in FIG. 1, with the same beneficial effects achieved. To avoid repetition, details are not described herein again.

Case 2: The terminal 900 is capable of implementing the processes of the method embodiment in FIG. 2.

The processor 910 is configured to:

in a case that at least one uplink signal is having a transmission collision, performing a first comparison operation on priority of the at least one uplink signal at a fourth moment; where an interval T2 is present between the fourth moment and a second sending moment of a third target uplink signal in the at least one uplink signal, and the fourth moment is earlier than the second sending moment.

Optionally, a value of $T_2$ is any one of the following: a processing duration of the third target uplink signal and a second preset duration.

Optionally, the radio frequency unit 901 is configured to send a fourth target uplink signal, where the fourth target uplink signal is a highest-priority uplink signal in a comparison result of the first comparison operation.

Optionally, the uplink signals under transmission collision include at least one of the following signal types: physical random access channel PRACH signal, physical uplink control channel PUCCH signal, physical uplink shared channel PUSCH signal, and sounding reference signal SRS.

It should be noted that the terminal 900 in case 2 is capable of implementing the processes of the method embodiment in FIG. 2, with the same beneficial effects achieved. To avoid repetition, details are not described herein again.

It should be understood that in this embodiment of the present invention, the radio frequency unit 901 may be configured to: receive and transmit signals in an information receiving/sending process or a call process; and specifically, after receiving downlink data from a base station, transmit the downlink information to the processor 910 for processing, and in addition, transmit uplink data to the base station. Generally, the radio frequency unit 901 includes but is not limited to an antenna, at least one amplifier, a transceiver, a coupler, a low noise amplifier, a duplexer, and the like. In addition, the radio frequency unit 901 may also communicate with a network and other devices via a wireless communications system.

The terminal provides a user with wireless broadband internet access through the network module 902, for example, helping the user to send and receive e-mails, browse web pages, and access streaming media.

The audio output unit 903 may convert audio data received by the radio frequency unit 901 or the network module 902 or stored in the memory 909 into an audio signal and output the audio signal as a sound. Furthermore, the audio output unit 903 may also provide audio output (for example, a call signal received sound or a message received sound) related to a specific function performed by the terminal 900. The audio output unit 903 includes a speaker, a buzzer, a receiver, and the like.

The input unit 904 is configured to receive an audio or video signal. The input unit 904 may include a graphics processing unit (GPU) 9041 and a microphone 9042. The graphics processing unit 9041 processes image data of a still picture or a video obtained by an image capture apparatus (for example, a camera) in an image capture mode or a video capture mode. A processed image frame may be displayed on the display unit 906. The image frame processed by the graphics processing unit 9041 may be stored in the memory 909 (or another storage medium) or be transmitted by the radio frequency unit 901 or the network module 902. The microphone 9042 is capable of receiving sounds and processing such sounds into audio data. The processed audio data may be converted in a telephone call mode into a format that can be transmitted by the radio frequency unit 901 to a mobile communications base station, for outputting.

The terminal 900 further includes at least one sensor 905, for example, an optical sensor, a motion sensor, and other sensors. Specifically, the optical sensor may include an ambient light sensor and a proximity sensor. The ambient light sensor may adjust luminance of the display panel 9061 based on brightness of ambient light, and the proximity sensor may turn off the display panel 9061 and/or backlight when the terminal 900 moves close to an ear. As a type of motion sensor, an accelerometer sensor can detect magnitudes of accelerations in all directions (usually three axes), can detect a magnitude and a direction of gravity when the mobile phone is in a static state, and can be applied to posture recognition (such as screen switching between portrait and landscape, related games, and magnetometer posture calibration) of the terminal, functions related to vibration recognition (such as pedometer and tapping), and the like. The sensor 905 may also include a fingerprint sensor, a pressure sensor, an iris sensor, a molecular sensor, a gyroscope, a barometer, a hygrometer, a thermometer, an infrared sensor, and the like. Details are not described herein.

The display unit 906 is configured to display information input by the user or information provided to the user. The display unit 906 may include the display panel 9061. The display panel 9061 may be configured in a form of a liquid crystal display (LCD), an organic light-emitting diode (OLED), or the like.

The user input unit 907 may be configured to: receive a digit or character information that is input, and generate signal input related to user settings and function control of the terminal. Specifically, the user input unit 907 may include a touch panel 9071 and other input devices 9072. The touch panel 9071 is also referred to as a touchscreen and can collect a touch operation (such as an operation performed by the user on the touch panel 9071 or near the touch panel 9071 with a finger or by using any proper object or accessory such as a stylus) of the user on or near the touch panel 9071. The touch panel 9071 may include two parts: a touch detection apparatus and a touch controller. The touch detection apparatus detects a touch azimuth of a user, detects a signal brought by a touch operation, and transmits the signal to the touch controller. The touch controller receives touch information from the touch detection apparatus, converts the touch information into touchpoint coordinates, and transmits the touchpoint coordinates to the processor 910, and can receive a command transmitted by the processor 910 and execute the command. In addition, the touch panel 9071 may be implemented in a plurality of forms, for example, as a resistive, capacitive, infrared, or surface acoustic wave touch panel. The user input unit 907 may further include the other input devices 9072 in addition to the touch panel 9071. Specifically, the other input devices 9072 may include but are not limited to a physical keyboard, a function key (such as a volume control key or an on/off key), a trackball, a mouse, and a joystick. Details are not described herein.

Further, the touch panel 9071 may cover the display panel 9061. When detecting a touch operation on or near the touch panel 9071, the touch panel 9071 transmits the touch operation to the processor 910 to determine a type of a touch event. Then, the processor 910 provides a corresponding visual output on the display panel 9061 based on the type of the touch event. In FIG. 9, the touch panel 9071 and the display panel 9061 serve as two independent components to implement input and output functions of the terminal. In some embodiments, however, the touch panel 9071 may be integrated with the display panel 9061 to implement the input and output functions of the terminal. This is not specifically limited herein.

The interface unit 908 is an interface between an external apparatus and the terminal 900. For example, the external apparatus may include a wired or wireless headphone port, an external power (or battery charger) port, a wired or wireless data port, a memory card port, a port for connecting an apparatus provided with a recognition module, an audio input/output (I/O) port, a video I/O port, an earphone port, and the like. The interface unit 908 may be configured to: receive input (for example, data information and power) from the external apparatus, and transmit the received input to one or more elements in the terminal 900, or may be configured to transmit data between the terminal 900 and the external apparatus.

The memory 909 may be configured to store software programs and various data. The memory 909 may mainly include a program storage area and a data storage area. The program storage area may store an operating system, and an application program required by at least one function (for example, a sound playback function or an image playback function). The data storage area may store data (for example, audio data or a phone book) created according to use of the mobile phone. In addition, the memory 909 may include a high-speed random access memory, and may further include a non-volatile memory such as at least one disk storage device, a flash memory device, or another volatile solid-state storage device.

The processor 910 is a control center of the terminal, and is connected to all components of the terminal by using various interfaces and lines. By running or executing a software program and/or module that is stored in the memory 909 and calling data stored in the memory 909, the processor 910 executes various functions of the terminal and processes data, so as to perform overall monitoring on the terminal. The processor 910 may include one or more processing units. Preferably, the processor 910 may integrate an application processor and a modem processor. The application processor mainly processes the operating system, a user interface, an application program, and the like. The modem processor mainly processes wireless communication. It can be understood that the modem processor may alternatively be not integrated in the processor 910.

The terminal 900 may further include the power supply 911 (such as a battery) supplying power to each component. Preferably, the power supply 911 may be logically connected to the processor 910 by using a power management system, so that functions such as charge and discharge management and power consumption management are implemented by using the power management system.

In addition, the terminal 900 includes some functional modules that are not illustrated. Details are not described herein.

Preferentially, an embodiment of the present invention further provides a terminal, including a processor 910, a memory 909, a computer program stored in the memory 909 and capable of running on the processor 910. When the computer program is executed by the processor 910, the processes of the method embodiment in FIG. 1 or FIG. 2 are implemented, with same technical effect achieved. To avoid repetition, details are not described herein again.

Figure 10:
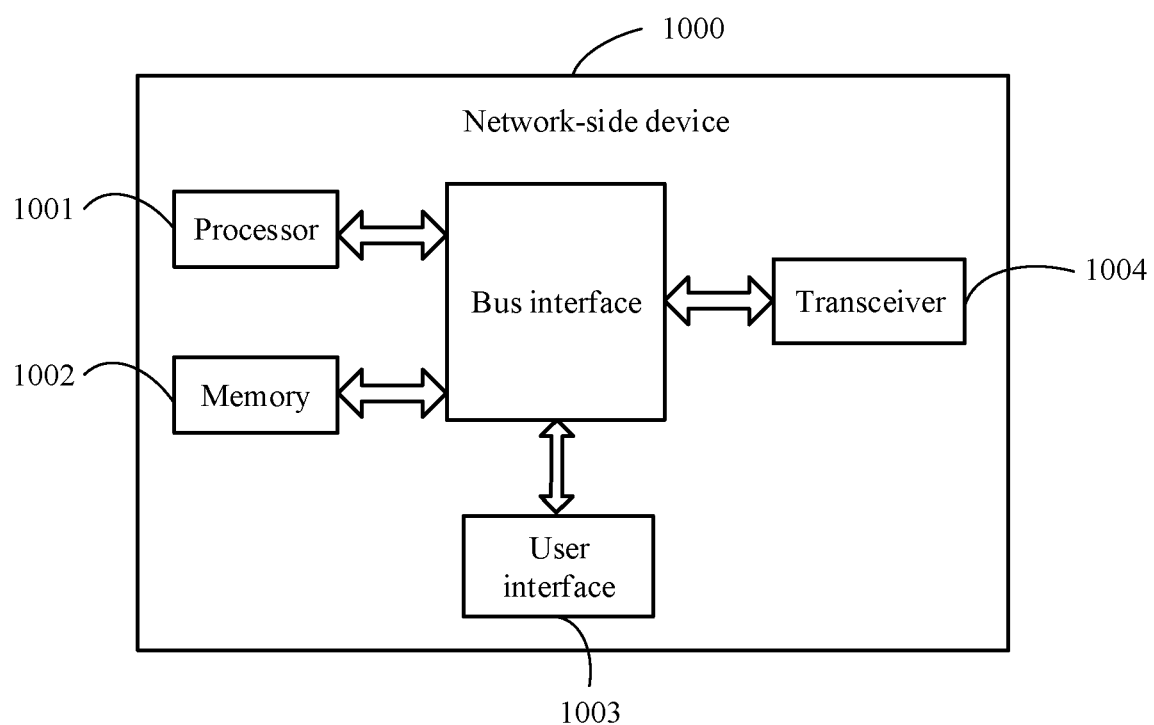
FIG. 10 is a third structural diagram of a network-side device according to an embodiment of the present invention.

Referring to FIG. 10, FIG. 10 is a third structural diagram of a network-side device according to an embodiment of the present invention. As shown in FIG. 10, the network-side device 1000 includes a processor 1001, a memory 1002, a user interface 1003, a transceiver 1004, and a bus interface.

In this embodiment of the present invention, the network-side device 1000 further includes: a computer program stored on the memory 1002 and capable of running on the processor 1001.

Case 1: The network-side device 1000 is capable of implementing the processes of the method embodiment in FIG. 3.

When the computer program is executed by the processor 1001, the following step is implemented:

sending first indication information to a terminal by using the transceiver 1004, where the first indication information is used to indicate that the terminal performs P comparison operations in a case that at least one uplink signal is having a transmission collision, where the $i^{th}$ comparison operation is used to compare priorities of N uplink signals under transmission collision at a first moment, the first moment is an execution moment of the $i^{th}$ comparison operation, a value of i ranges from 1 to P, P is a positive integer less than or equal to K, and both K and N are integers greater than 1.

Optionally, the first indication information is specifically used to indicate that the terminal performs the $(i+1)^{th}$ comparison operation if a first condition is satisfied in a case that the terminal has performed the $i^{th}$ comparison operation, where the first condition satisfies at least one of the following:

priorities of uplink signals under transmission collision being changed; and the number of uplink signals under transmission collision being changed.

Optionally, the priority of an uplink signal under transmission collision having changed includes at least one of the following:

priority of a first uplink signal in the N uplink signals at a second moment is higher than priority of the first uplink signal at the first moment;

priority of a second uplink signal in the N uplink signals at the second moment is lower than the priority of the first uplink signal at the first moment; and a first comparison result is different from a second comparison result, where the first comparison result is a comparison result between priorities of a third uplink signal and a fourth uplink signal in the N uplink signals at the first moment, and the second comparison result is a comparison result between priorities of the third uplink signal and the fourth uplink signal at the second moment; where the second moment is an execution time of the $(i+1)^{th}$ comparison operation.

Optionally, the first indication information is specifically used to indicate that the terminal performs the $(i+1)^{th}$ comparison operation at or before a third moment if the first condition is satisfied in the case that the terminal has performed the $i^{th}$ comparison operation; where there is an interval $T_1$ between the third moment and a first sending moment of a first target uplink signal in M uplink signals, and the third moment is earlier than the first sending moment, and the M uplink signals are uplink signals under transmission collision at an execution moment of the $(i+1)^{th}$ comparison operation.

Optionally, a value of $T_1$ is any one of the following: a processing duration of the first target uplink signal and a first preset duration.

Optionally, when the computer program is executed by the processor 1001, the following step may be further implemented:

sending second indication information to the terminal by using the transceiver 1004, where the second indication information is used to indicate a value of K.

Optionally, when the computer program is executed by the processor 1001, the following step may be further implemented:

receiving, by using the transceiver 1004, a second target uplink signal sent by the terminal, where the second target uplink signal is a highest-priority uplink signal in a comparison result of the $P^{th}$ comparison operation.

Optionally, the uplink signals under transmission collision include at least one of the following signal types: physical random access channel PRACH signal, physical uplink control channel PUCCH signal, physical uplink shared channel PUSCH signal, and sounding reference signal SRS.

It should be noted that the network-side device 1000 in case 1 is capable of implementing the processes implemented by the network-side device in the method embodiment of FIG. 3. To avoid repetition, details are not described herein again.

Case 2: The network-side device 1000 is capable of implementing the processes of the method embodiment in FIG. 4.

When the computer program is executed by the processor 1001, the following step is implemented:

sending third indication information to a terminal by using the transceiver 1004, where the third indication information is used to indicate that the terminal performs a first comparison operation on priority of at least one uplink signal at a fourth moment in a case that the at least one uplink signal is having a transmission collision; where an interval T2 is present between the fourth moment and a second sending moment of a third target uplink signal in the at least one uplink signal, and the fourth moment is earlier than the second sending moment.

Optionally, a value of $T_2$ is any one of the following: a processing duration of the third target uplink signal and a second preset duration.

Optionally, when the computer program is executed by the processor 1001, the following step may be further implemented:

receiving a fourth target uplink signal by using the transceiver 1004, where the fourth target uplink signal is a highest-priority uplink signal in a comparison result of the first comparison operation.

Optionally, the uplink signals under transmission collision include at least one of the following signal types: physical random access channel PRACH signal, physical uplink control channel PUCCH signal, physical uplink shared channel PUSCH signal, and sounding reference signal SRS.

It should be noted that the network-side device 1000 in case 2 is capable of implementing the processes implemented by the network-side device in the method embodiment of FIG. 4. To avoid repetition, details are not described herein again.

In FIG. 10, a bus architecture may include any quantity of interconnected buses and bridges, specifically for interconnecting various circuits of one or more processors represented by the processor 1001 and a memory represented by the memory 1002. The bus architecture may further interconnect various other circuits such as a peripheral device, a voltage regulator, and a power management circuit. These are all well known in the art, and therefore are not further described in this specification. The bus interface provides an interface. The transceiver 1004 may be a plurality of components, that is, the transceiver 1004 includes a transmitter and a receiver, and provides a unit for communicating with various other apparatuses on a transmission medium. For different user equipments, the user interface 1003 may also be an interface that can be externally or internally connected to a required device. The connected device includes but is not limited to a keypad, a display, a speaker, a microphone, a joystick, and the like.

The processor 1001 is responsible for management of the bus architecture and general processing, and the memory 1002 is capable of storing data that is used by the processor 1001 during operation.

An embodiment of the present invention further provides a computer-readable storage medium, where a computer program is stored in the computer-readable storage medium. When the computer program is executed by a processor, the processes of the foregoing method embodiment shown in FIG. 1, FIG. 2, FIG. 3, or FIG. 4 are implemented, with same technical effects achieved. To avoid repetition, details are not described herein again. The computer-readable storage medium is, for example, a read-only memory (ROM), a random access memory (RAM), a magnetic disk, or an optical disc.

It may be understood that the embodiments described in this disclosure may be implemented by hardware, software, firmware, middleware, microcode, or a combination thereof. For hardware implementation, a module, a unit, a submodule, a subunit, and the like may be implemented in one or more application specific integrated circuits (ASIC), digital signal processors (DSP), digital signal processing devices (DSPD), programmable logic devices (PLD), field-programmable gate arrays (FPGA), general-purpose processors, controllers, microcontrollers, microprocessors, and other electronic units for performing the functions described in this application, or a combination thereof.

It should be noted that the terms "comprise", "include", or any of their variants are intended to cover a non-exclusive inclusion, such that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element.

According to the description of the foregoing implementations, persons skilled in the art can clearly understand that the method in the foregoing embodiments may be implemented by software in addition to a necessary universal hardware platform or by hardware only. In most cases, the former is a more preferred implementation. Based on such an understanding, the technical solutions of the present invention essentially, or the part contributing to the related art, may be implemented in a form of a software product. The software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of the present invention.

The embodiments of the present invention are described above with reference to the accompanying drawings, but the present invention is not limited to the foregoing implementations. The foregoing embodiments are only illustrative rather than restrictive. Inspired by the present invention, a person of ordinary skill in the art can still derive many variations without departing from the essence of the present invention and the protection scope of the claims. All these variations shall fall within the protection of the present invention.

What is claimed is:

1. A transmission priority processing method, applied to a terminal and comprising:

performing P comparison operations in a case that at least one uplink signal is having a transmission collision, wherein the $i^{th}$ comparison operation is used to compare priorities of N uplink signals under transmission collision at a first moment, the first moment is an execution moment of the $i^{th}$ comparison operation, a value of i ranges from 1 to P, P is a positive integer less than or equal to K, and both K and N are integers greater than 1.

2. The method according to claim 1, wherein the performing P comparison operations comprises:

in a case that the $i^{th}$ comparison operation has been performed, performing the $(i+1)^{th}$ comparison operation if a first condition is satisfied, wherein the first condition being satisfied comprises at least one of the following:

priority of an uplink signal under transmission collision having changed; and the number of uplink signals under transmission collision having changed.

3. The method according to claim 2, wherein the priority of an uplink signal under transmission collision having changed comprises at least one of the following:

priority of a first uplink signal in the N uplink signals at a second moment is higher than priority of the first uplink signal at the first moment;

priority of a second uplink signal in the N uplink signals at the second moment is lower than the priority of the first uplink signal at the first moment; and a first comparison result is different from a second comparison result, wherein the first comparison result is a comparison result between priorities of a third uplink signal and a fourth uplink signal in the N uplink signals at the first moment, and the second comparison result is a comparison result between priorities of the third uplink signal and the fourth uplink signal at the second moment; wherein the second moment is an execution time of the $(i+1)^{th}$ comparison operation.

4. The method according to claim 2, wherein the performing the $(i+1)^{th}$ comparison operation if a first condition is satisfied comprises:

if the first condition is satisfied, performing the $(i+1)^{th}$ comparison operation at or before a third moment; wherein there is an interval $T_1$ between the third moment and a first sending moment of a first target uplink signal in M uplink signals, and the third moment is earlier than the first sending moment, and the M uplink signals are uplink signals under transmission collision at an execution moment of the $(i+1)^{th}$ comparison operation.

5. The method according to claim 4, wherein a value of $T_1$ is any one of the following: a processing duration of the first target uplink signal and a first preset duration.

6. The method according to claim 1, wherein a value of K is configured by a network-side device or specified by a protocol.

7. The method according to claim 1, wherein after the performing P comparison operations, the method further comprises:
sending a second target uplink signal, wherein the second target uplink signal is a highest-priority uplink signal in a comparison result of the $P^{th}$ comparison operation.

8. The method according to claim 1, wherein the uplink signals under transmission collision comprise at least one of the following signal types: physical random access channel (PRACH) signal, physical uplink control channel (PUCCH) signal, physical uplink shared channel (PUSCH) signal, and sounding reference signal SRS.

9. A transmission priority processing method, applied to a network-side device and comprising:
sending first indication information to a terminal, wherein the first indication information is used to indicate that the terminal performs P comparison operations in a case that at least one uplink signal is having a transmission collision, wherein the $i^{th}$ comparison operation is used to compare priorities of N uplink signals under transmission collision at a first moment, the first moment is an execution moment of the $i^{th}$ comparison operation, a value of i ranges from 1 to P, P is a positive integer less than or equal to K, and both K and N are integers greater than 1.

10. The method according to claim 9, wherein the first indication information is specifically used to indicate that the terminal performs the $(i+1)^{th}$ comparison operation if a first condition is satisfied in a case that the terminal has performed the $i^{th}$ comparison operation, wherein the first condition satisfies at least one of the following:
priorities of uplink signals under transmission collision being changed; and
the number of uplink signals under transmission collision being changed.

11. The method according to claim 10, wherein the priority of an uplink signal under transmission collision having changed comprises at least one of the following:
priority of a first uplink signal in the N uplink signals at a second moment is higher than priority of the first uplink signal at the first moment;
priority of a second uplink signal in the N uplink signals at the second moment is lower than the priority of the first uplink signal at the first moment; and
a first comparison result is different from a second comparison result, wherein the first comparison result is a comparison result between priorities of a third uplink signal and a fourth uplink signal in the N uplink signals at the first moment, and the second comparison result is a comparison result between priorities of the third uplink signal and the fourth uplink signal at the second moment; wherein
the second moment is an execution time of the $(i+1)^{th}$ comparison operation.

12. The method according to claim 10, wherein the first indication information is specifically used to indicate that the terminal performs the $(i+1)^{th}$ comparison operation at or before a third moment if the first condition is satisfied in the case that the terminal has performed the $i^{th}$ comparison operation; wherein
there is an interval $T_1$ between the third moment and a first sending moment of a first target uplink signal in M uplink signals, and the third moment is earlier than the first sending moment, and the M uplink signals are uplink signals under transmission collision at an execution moment of the $(i+1)^{th}$ comparison operation.

13. The method according to claim 12, wherein a value of $T_1$ is any one of the following: a processing duration of the first target uplink signal and a first preset duration.

14. The method according to claim 9, further comprising:
sending second indication information to the terminal, wherein the second indication information is used to indicate a value of K.

15. The method according to claim 9, wherein after the sending first indication information to a terminal, the method comprises:
receiving a second target uplink signal sent by the terminal, wherein the second target uplink signal is a highest-priority uplink signal in a comparison result of the $P^{th}$ comparison operation.

16. The method according to claim 9, wherein the uplink signals under transmission collision comprise at least one of the following signal types: physical random access channel PRACH signal, physical uplink control channel PUCCH signal, physical uplink shared channel PUSCH signal, and sounding reference signal SRS.

17. A terminal, comprising a processor, a memory, and a program stored in the memory and capable of running on the processor, wherein when the program is executed by the processor, the processor is configured to:
perform P comparison operations in a case that at least one uplink signal is having a transmission collision, wherein the $i^{th}$ comparison operation is used to compare priorities of N uplink signals under transmission collision at a first moment, the first moment is an execution moment of the $i^{th}$ comparison operation, a value of i ranges from 1 to P, P is a positive integer less than or equal to K, and both K and N are integers greater than 1.

18. The terminal according to claim 17, wherein in performing P comparison operations, the processor is specifically configured to:
in a case that the $i^{th}$ comparison operation has been performed, perform the $(i+1)^{th}$ comparison operation if a first condition is satisfied, wherein the first condition being satisfied comprises at least one of the following:
priority of an uplink signal under transmission collision having changed; and
the number of uplink signals under transmission collision having changed.

19. The terminal according to claim 18, wherein the priority of an uplink signal under transmission collision having changed comprises at least one of the following:
priority of a first uplink signal in the N uplink signals at a second moment is higher than priority of the first uplink signal at the first moment;
priority of a second uplink signal in the N uplink signals at the second moment is lower than the priority of the first uplink signal at the first moment; and
a first comparison result is different from a second comparison result, wherein the first comparison result is a comparison result between priorities of a third uplink signal and a fourth uplink signal in the N uplink signals at the first moment, and the second comparison result is a comparison result between priorities of the third uplink signal and the fourth uplink signal at the second moment; wherein
the second moment is an execution time of the $(i+1)^{th}$ comparison operation.

20. A network-side device, comprising a processor, a memory, and a program stored in the memory and capable of running on the processor, wherein when the program is executed by the processor, the processor is configured to perform steps of the transmission priority processing method according to claim 9.

\* \* \* \* \*